United States Patent [19]
Andersson

[11] 3,958,629
[45] May 25, 1976

[54] FLUID RECEPTACLE HAVING AT LEAST ONE HEAT EXCHANGING UNIT DETACHABLY MOUNTED THEREIN

[75] Inventor: Sven Erik Alvar Andersson, Sodertalje, Sweden

[73] Assignee: AB Svenska Maskinverken, TarFalla, Sweden

[22] Filed: Dec. 20, 1974

[21] Appl. No.: 534,811

[30] Foreign Application Priority Data
Dec. 21, 1973 Sweden .............................. 73174187

[52] U.S. Cl. ................................ 165/74; 165/162; 122/510
[51] Int. Cl.² ............................................ F28D 7/10
[58] Field of Search ................... 165/156, 8, 76, 77, 165/143, 163, 145, 73, 74; 122/510

[56] References Cited
UNITED STATES PATENTS

| | | | |
|---|---|---|---|
| 1,617,519 | 2/1927 | Hartman .............................. | 165/158 |
| 2,207,037 | 7/1940 | Jacocks ................................ | 165/76 |
| 2,303,613 | 12/1942 | Charlton .......................... | 165/163 X |
| 2,961,221 | 11/1962 | Friese et al. ..................... | 165/143 X |
| 3,305,002 | 2/1967 | Leonard, Jr. et al. ................ | 165/74 |

Primary Examiner—Charles J. Myhre
Assistant Examiner—Theophil W. Streule, Jr.
Attorney, Agent, or Firm—Fleit & Jacobson

[57] ABSTRACT

A fluid receptacle is disclosed having at least one heat exchanging unit detachably mounted therein to permit an exchange of heat between a first fluid fed through said unit and a second fluid received in said receptacle. Said heat exchanging unit is sealingly mounted in an opening in the wall of the receptacle by means of an end flange provided at the outer end of said unit and having inlet and outlet conduits for said first fluid extending from its outer side. According to the invention the transverse dimensions of the heat exchanging unit are such as to permit said unit to be inserted into the receptacle and removed therefrom through a manhole provided in the wall of the receptacle. The receptacle is provided with a stationary annular supporting surface for the end flange of the heat exchanging unit. Said supporting surface faces the interior of the receptacle and surrounds an opening having sufficient size to permit the inlet and outlet conduits extending from the outer side of said end flange to move freely through said opening when the heat exchanging unit is inserted into the receptacle or removed therefrom.

7 Claims, 5 Drawing Figures

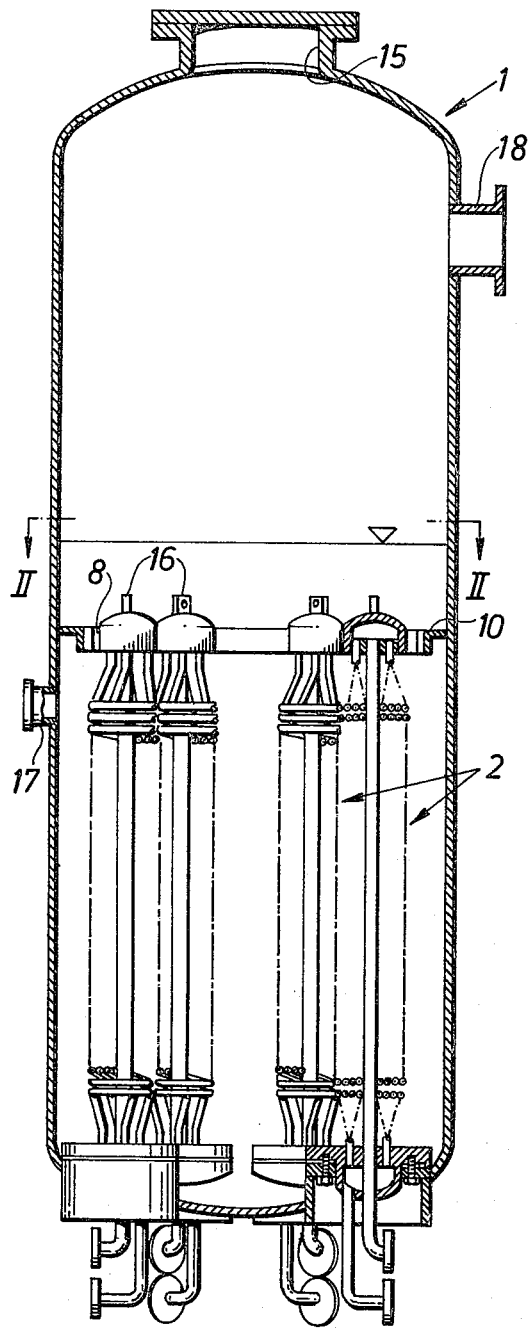
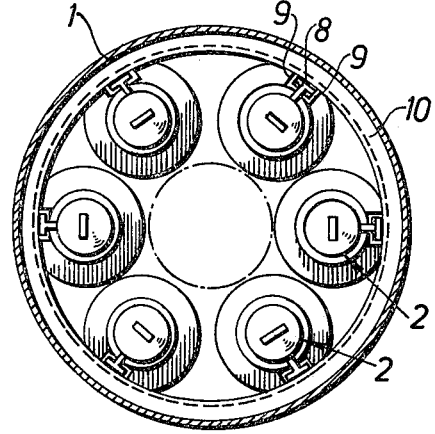
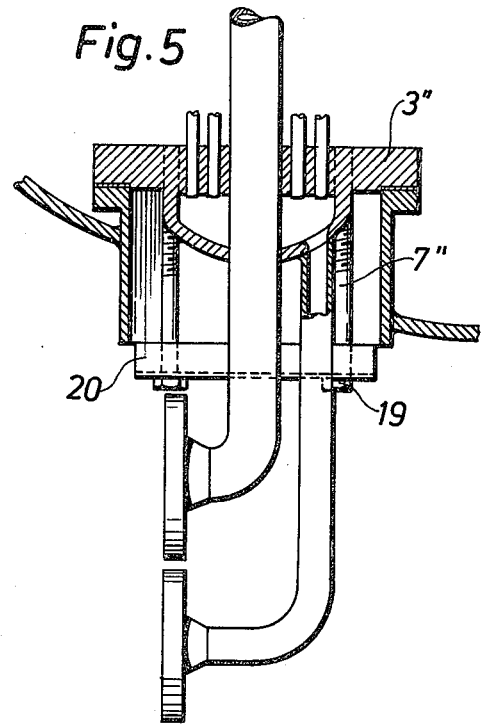

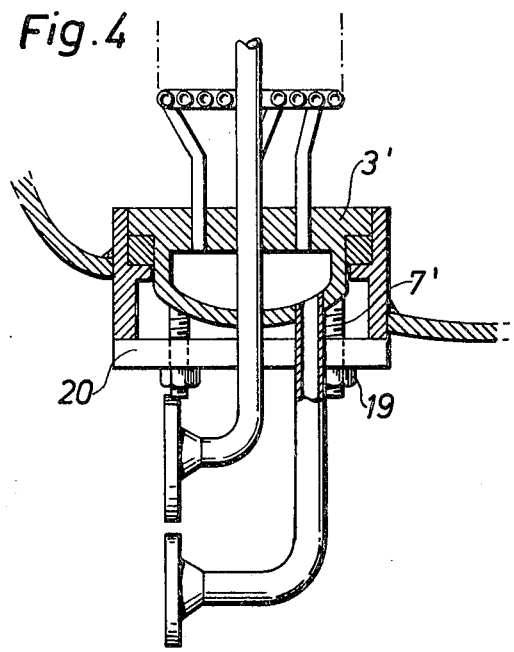
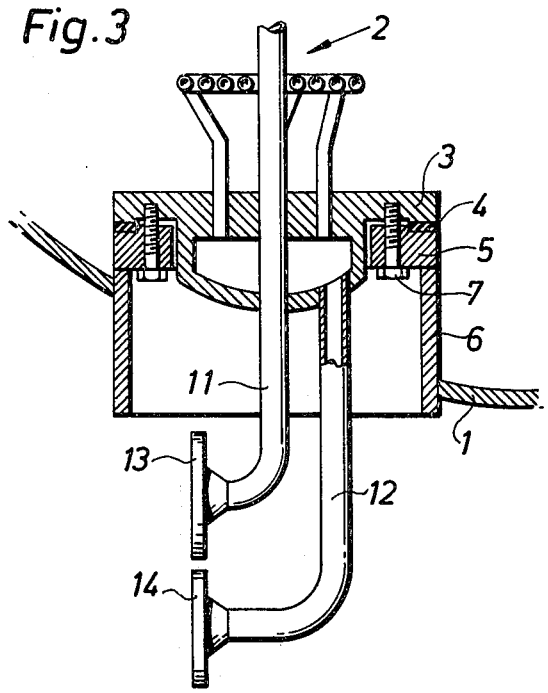

FLUID RECEPTACLE HAVING AT LEAST ONE HEAT EXCHANGING UNIT DETACHABLY MOUNTED THEREIN

The present invention relates to a fluid receptacle having at least one heat exchanging unit detachably mounted therein to permit an exchange of heat between a first fluid fed through said unit and a second fluid received in said receptacle, said heat exchanging unit being sealingly mounted in an opening in the wall of the receptacle by means of an end flange provided at the outer end of said unit, said end flange having inlet and outlet conduits for said first fluid extending from its outer side.

For instance, the receptacle may be a pressure vessel in which the heat exchanging unit is utilized for heating and/or vaporizing a liquid received in said vessel. However, the receptacle may also be of other type.

An obvious disadvantage of previously known fluid receptacles of the kind above described is the large free space required externally of the receptacle in front of each opening in the wall of the receptacle where a heat exchanging unit is to be mounted. This space requirement has been caused by the fact that the heat exchanging units have been inserted into and removed from the receptacle through said openings. The above disadvantage is especially manifest when, as usually is the case, the heat exchanging units are mounted in the lower portion of the receptacle, normally in its bottom, as this means that the receptacle has to be placed upon a high support structure leaving the required free space below the receptacle to permit the heat exchanging units to be inserted into the receptacle from its lower side.

An object of the invention is to provide an improved fluid receptacle of the kind initially specified permitting a substantial reduction of the requirement on free space externally of the receptacle. In accordance with the invention there is provided a receptacle of said kind which is characterized in that the transverse dimensions of the heat exchanging unit are such as to permit said unit to be inserted into the receptacle and removed therefrom through a manhole provided in the wall of the receptacle, the receptacle being provided with a stationary annular supporting surface for said end flange of the heat exchanging unit, said supporting surface facing the interior of the receptacle and surrounding an opening having sufficient size to permit the inlet and outlet conduits extending from the outer side of said end flange to move freely through said opening when the heat exchanging unit is inserted into the receptacle or removed therefrom.

The invention results in a considerable reduction of the free space required externally of the receptacle, as the heat exchanging unit no longer needs to be inserted into the receptacle through the opening in the receptacle wall, where it is to be mounted. Instead, said unit can be inserted into the receptacle through the manhole, where a substantial free space is required also for other purposes. The invention also facilitates the use of several indivudual heat exchanging units in a single receptacle which for certain applications may involve considerable advantages compared with the use of a single large heat exchanging unit.

The end flange of the heat exchanging unit may advantageously be arranged to be secured in a position resting against the supporting surface by means of fastening means accessible externally of the receptacle.

Below the invention will be further described, reference being had to the accompanying drawings, in which:

FIG. 1 shows a steam generator, in sectional elevation, comprising an upright generally cylindrical pressure vessel having a number of heat exchanging units mounted at its bottom;

FIG. 2 is a sectional view taken along line II—II in FIG. 1;

FIG. 3 is a partial view, in cross-section and on an enlarged scale, showing the connection between a heat exchanging unit and the bottom of the pressure vessel shown in FIG. 1;

FIG. 4 is a partial sectional view, corresponding to FIG. 3 but showing an alternative connection between a heat exchanging unit and the bottom of the pressure vessel; and FIG. 5 is a corresponding partial view, illustrating still another alternative connection between a heat exchanging unit and the bottom of the pressure vessel.

In the drawings, reference numeral 1 generally designates an upright substantially cylindrical pressure vessel containing a number of heat exchanging units 2 located in the lower portion of the vessel. Said heat exchanging units may, for instance, be of the kind disclosed in British patent specification No. 1,323,943 although it should be noted that they do not include any surrounding outer jackets. At its lower end, each heat exchanging unit 2 has an end flange 3 resting, through an intermediate gasket 4, against a stationary annular support surface which faces the interior of the pressure vessel and is formed by the upper side of an annular flange 5 provided at the upper end of a pipe socket 6 welded to the bottom wall of the vessel. As can be seen from FIG. 3, said end flange 3 of the heat exchanging unit 2 is secured on the stationary flange 5 by means of four threaded bolts 7 which are positioned radially within gasket 4 and extend through clearance holes in flange 5 and are threaded into end flange 3. At its upper end, each heat exchanging unit 2 is provided with a T-shaped lateral projection 8 which is arranged to be received for longitudinal displacement between two angle iron portions 9 forming stationary guide members. Said guide members 9 are fixed on a support ring 10 mounted on the inner surface of the pressure vessel 1.

At their lower ends, the heat exchanging units 2 are provided with inlet and outlet conduits 11 and 12, respectively, extending from the lower surface of end flange 3. At their outer bent ends said conduits are provided with flanges 13 and 14, respectively, serving to connect said conduits to stationary pipes positioned externally of the pressure vessel 1. The central opening in the stationary flange 5 has sufficient size to permit the conduits 11 and 12 with their associated flanges 13 and 14 to be freely displaced therethrough. The transverse dimensions of each heat exchanging unit 2 are such as to permit the complete unit to be inserted into the pressure vessel 1 and withdrawn therefrom through a manhole 15 provided at the upper end of the vessel. At their upper ends, the heat exchanging units 2 are provided with lifting eyes 16 to which ropes or wires may be connected to facilitate the insertion and removal of said units.

When the heat exchanging units 2 are to be mounted in the pressure vessel 1, they are inserted into said vessel one at a time through the manhole 15, whereupon the end flange 3 of each unit 2 is positioned on the corresponding stationary flange 5 and the projection 8 at the upper end of unit 2 is simulataneously inserted between the guide members 9 on the carrier ring 10. The bolts 7 are then slightly tightened. When all units 2 have been installed within the pressure vessel 1 the final tightening of the bolts 7 may be carried out with the vessel 1 subjected to an internal overpressure.

The pressure vessel shown in the drawings constitutes a steam generator in which primary steam is supplied through the inlet conduits 11 of the heat exchanging units 2 and condensate is discharged through outlet conduits 12. Feed water is supplied to the vessel 1 through an inlet pipe 17 and secondary steam generated within the vessel 1 is discharged through an oulet pipe 18.

In the embodiments according to FIGS. 4 and 5 the threaded bolts 7 have been replaced by stud bolts 7' and 7" welded to the end flanges 3' and 3", respectively. The required fixation of the heat exchanging units is carried out by means of nuts 19 which are threaded on the stud bolts and tightened against yokes 20 resting on the outer edge of the pipe sockets 6' and 6", respectively.

The invention is not restricted to the arrangement above described and illustrated in the drawings. Thus, the invention may be applied also on other types of pressure vessels than steam generators as well as on receptacles in which any overpressure is not utilized. For instance, the invention may be applied on oil transport or storage tanks wherein a number of heat exchanging units may be used for heating the oil contained in the tank to make said oil more fluid when it is to be pumped out from the tank.

What I claim is:

1. A fluid receptacle for exchanging heat between a first fluid flowing through at least one heat exchanging unit and a second fluid received in a fluid receptacle chamber, the receptacle comprising: a fluid receptacle chamber having a wall defining an interior space and means for receiving said second fluid; heat exchanging unit means detachably mounted in the interior of said receptacle; an exchanger opening through the wall of said receptacle at a first location; a manhole opening through the wall of said receptacle at a second location spaced from said first location; a supporting flange integral with the wall of said receptacle, around the periphery of said exchanger opening, and defining a supporting surface facing the interior of said receptacle for supporting said heat exchanging unit means; an end flange at one end of said heat exchanging unit means defining an abutment surface facing away from heat exchanging unit means and toward said supporting surface, for contacting and being supported by said supporting surface; inlet and outlet conduits for the passage of said first fluid, mounted on said end flange, and extending away from said heat exchanging unit means and through said exchanger opening; and mounting means for detachably sealingly mounting said heat exchanging unit means in the interior of said receptacle; wherein the size of said exchanger opening enables the unobstructed passage of said inlet and outlet conduits therethrough; and wherein the size of said manhole opening enables the unobstructed passage of said heat exchanging unit means therethrough.

2. The fluid receptacle recited in claim 1, wherein said mounting means comprises fastening means which are accessible externally of said receptacle.

3. The fluid receptacle recited in claim 2, wherein said fastening means comprise a plurality of bolts extending through said supporting flange from the exterior of said receptacle, and whereby said bolts threadably engage said end flange.

4. The fluid receptacle recited in claim 2, wherein said mounting means comprise a plurality of bolts integral with and extending from said end flange, and wherein said end flange and said supporting flange are detachably connected together by means of nuts associating with said bolts.

5. The fluid receptacle recited in claim 1, wherein said heat exchanging unit means comprise a plurality of heat exchanging units.

6. The fluid receptacle recited in claim 1, wherein said end flange lies vertically above said supporting flange.

7. The fluid receptacle recited in claim 1, and further comprising alignment means for maintaining said heat exchanging unit means in a predetermined orientation in said receptacle.

* * * * *